United States Patent
Jung et al.

(10) Patent No.: US 9,480,004 B2
(45) Date of Patent: Oct. 25, 2016

(54) DISCOVERY METHOD AND APPARATUS IN DEVICE-TO-DEVICE DIRECT COMMUNICATION

(71) Applicant: Electronics and Telecommunications Research Institute, Daejeon (KR)

(72) Inventors: Soojung Jung, Daejeon (KR); Seungkwon Cho, Daejeon (KR); Hyung Jin Kim, Daejeon (KR); Seokki Kim, Daejeon (KR); Hyun Lee, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 70 days.

(21) Appl. No.: 14/271,872

(22) Filed: May 7, 2014

(65) Prior Publication Data
US 2015/0009858 A1    Jan. 8, 2015

(30) Foreign Application Priority Data

Jul. 8, 2013 (KR) .................. 10-2013-0079945
Feb. 12, 2014 (KR) .................. 10-2014-0016126

(51) Int. Cl.
*H04W 48/12* (2009.01)
*H04W 84/18* (2009.01)
*H04L 12/24* (2006.01)
*H04W 48/16* (2009.01)
*H04L 12/751* (2013.01)

(52) U.S. Cl.
CPC .......... *H04W 48/12* (2013.01); *H04L 41/0806* (2013.01); *H04L 45/02* (2013.01); *H04W 48/16* (2013.01); *H04W 84/18* (2013.01)

(58) Field of Classification Search
CPC .................................................... H04W 48/12
See application file for complete search history.

(56) References Cited

U.S. PATENT DOCUMENTS

| | | | |
|---|---|---|---|
| 2003/0041141 A1* | 2/2003 | Abdelaziz ............. | G06F 9/4416 709/223 |
| 2003/0152059 A1* | 8/2003 | Odman .................... | H04B 1/69 370/338 |
| 2004/0044727 A1* | 3/2004 | Abdelaziz ........... | H04L 61/3065 709/203 |

(Continued)

FOREIGN PATENT DOCUMENTS

| KR | 10-2012-0129815 A | 11/2012 |
|---|---|---|
| KR | 10-2013-0040749 A | 4/2013 |

OTHER PUBLICATIONS

Seungkwon Cho et al., "A MAC proposal for PAC operating in synchronous mode" IEEE P802.15 Working Group for Wireless Personal Area Networks (WPANS), Jul. 15, 2013.

*Primary Examiner* — Andrew Lai
*Assistant Examiner* — Andrew C Lee
(74) *Attorney, Agent, or Firm* — Rabin & Berdo, P.C.

(57) ABSTRACT

A discovery method is provided by a device in a D2D direction communication. The device selects a discovery resource unit from among discovery resource units which are not being used after listening during one or more discovery resource periods. The device transmits a first discovery signal through the selected discovery resource unit in a broadcasting manner at a first discovery resource period, and transmits a second discovery signal through the selected discovery resource unit in a query-based manner at a second discovery resource period.

20 Claims, 11 Drawing Sheets

(56) References Cited

U.S. PATENT DOCUMENTS

| | | | |
|---|---|---|---|
| 2006/0142034 A1* | 6/2006 | Wentink | H04W 8/005 455/515 |
| 2007/0147317 A1* | 6/2007 | Smith | H04W 48/18 370/338 |
| 2012/0294245 A1* | 11/2012 | Chang | H04W 56/002 370/329 |
| 2013/0109313 A1* | 5/2013 | Kneckt | H04W 8/005 455/41.2 |
| 2013/0109314 A1* | 5/2013 | Kneckt | H04W 4/008 455/41.2 |
| 2013/0114526 A1* | 5/2013 | Ahn | H04W 8/005 370/329 |
| 2013/0232253 A1* | 9/2013 | Elhaddad | H04L 67/104 709/224 |
| 2014/0064487 A1* | 3/2014 | Abraham | H04L 63/045 380/270 |
| 2014/0112224 A1* | 4/2014 | Jafarian | H04W 52/0209 370/311 |
| 2014/0148099 A1* | 5/2014 | Reunamaki | H04W 52/0209 455/41.2 |
| 2014/0198783 A1* | 7/2014 | Qi | H04W 56/0015 370/350 |
| 2014/0321317 A1* | 10/2014 | Kasslin | H04W 4/08 370/254 |

* cited by examiner

DISCOVERY METHOD AND APPARATUS IN DEVICE-TO-DEVICE DIRECT COMMUNICATION

CROSS-REFERENCE TO RELATED APPLICATION

This application claims priority to and the benefit of Korean Patent Application Nos. 10-2013-0079945 and 10-2014-0016126 filed in the Korean Intellectual Property Office on Jul. 8, 2013 and Feb. 12, 2014, the entire contents of which are incorporated herein by reference.

BACKGROUND (a) Field

The present invention generally relates to a discovery method and apparatus in a device-to-device direction communication.

(b) Description of the Related Art

Recently, interest in a device-to-device (D2D) direct communication is increasing for providing a proximity-based service. Accordingly, various techniques for supporting the D2D direct communication are developed.

The procedures of the direct communication may be classified into a discovery procedure identifying and discovering neighbor devices for the D2D direct communication and a procedure establishing a communication path with the neighbor devices and performing the direct communication through the established path.

In the discovery procedure, device identifier information and service-related information provided by the device may be obtained. For the discovery, a device joining in the D2D direct communication may periodically provide own device identifier information or service information to neighbor devices in a broadcasting manner. Alternatively, the device may obtain identifier information and target service information of the neighbor device in a query-based manner exchanging a request/response message with the neighbor device.

Since few radio resources are required for broadcasting the identifier information of the device, overhead due to the periodic broadcast is not relatively high. However, if the device providing many services periodically broadcasts all information for the services, the overhead is increased and the efficiency of radio resources is decreased. Accordingly, in the conventional arts, the device does not broadcast the service information through a radio channel. The neighbor device establishes a communication path with the device and receives the service information from the device through the established path. However, the neighbor device should always negotiate with the device for the service after establishing the communication path with the device even if the device does not provide the service. Therefore, unnecessary communication path can be established between the neighbor devices.

In case of the query-based manner exchanging the request/response message, the small amount of information can be included in the request/response message since only necessary service information is provided. Further, the query-based manner can provide the device with the response message faster than the broadcasting manner. However, the efficiency of resources may be deteriorated since resources used in the neighbor devices can be collided when the request message and the response message are transmitted. Furthermore, in the broadcasting manner, the device can know status change of the neighbor devices through the periodically broadcasted information. However, in the query-based manner, the device can know the status change of the neighbor devices only with exchanging messages.

SUMMARY

An aspect of the present invention provides a discovery method and apparatus in a D2D direct communication for using a broadcasting manner together with a query-based manner.

According to another aspect of an embodiment of the present invention, a discovery method is provided by a device in a D2D direct communication. The discovery method includes listening during one or more discovery resource periods, selecting a discovery resource unit from among discovery resource units which are not being used after listening, transmitting a first discovery signal through the selected discovery resource unit in a broadcasting manner at a first discovery resource period, and transmitting a second discovery signal through the selected discovery resource unit in a query-based manner at a second discovery resource period.

The first discovery signal may be a discovery signal for a device advertisement, and may include identifier information of the device.

In this case, the first discovery signal may further include a service information version. The service information version may be changed due to variation of a service provided by the device or change of a user of the device.

The first discovery signal may be a discovery signal for a service advertisement, and may include service identifier information of the device.

In this case, the first discovery signal may further include a sequence number for identifying a plurality of services and an end indication for indicating an end of the service advertisement when the device provides the plurality of services.

The second discovery signal may be a discovery signal for a service information request, and may include identifier information of a target device.

In this case, the second discovery signal may further include a request range for indicating whether whole service information or a part of service information is requested.

The discovery method may include receiving a third discovery signal for a service information request from other device. The second discovery signal may be transmitted in response to the third discovery signal and may be a discovery signal for a service information response. The second discovery signal may include service identifier information of the device.

In this case, the second discovery signal may further include a sequence number for identifying a plurality of services and an end indication for indicating an end of the service information response when the device provides the plurality of services.

The second discovery signal may be a discovery signal for a peer search request, and may include identifier information of a target service.

In this case, identifier information of a specific device may be not included in the identifier information of the target service.

The discovery method may further include receiving a third discovery signal for a peer search request from other device. When the device provides a service requested by the peer search request, the second discovery signal may be transmitted in response to the third discovery signal and may be a discovery signal for a service information response. The second discovery signal may include service identifier information of the device.

The discovery method may further include masking a cyclic redundancy check (CRC) of the first discovery signal or second discovery signal with specific key information, and adding the masked CRC to the first discovery signal or the second discovery signal.

According to yet another aspect of the present invention, a discovery method is provided by a device in a D2D direct communication. The discovery method includes periodically transmitting a discovery signal through a discovery resource unit, and receiving discovery signals from other devices through other discovery resource units. The discovery signal that is periodically transmitted includes a type field for indicating any one type of a plurality of types including a device advertisement type, a service advertisement type, a service information request type, a service information response type, a peer search request type, and peer search response type, and an identifier field including identifier information according to the type indicated by the type field.

The identifier information may be identifier information of the device in case of the device advertisement type, service identifier information of the device in case of the service advertisement type, identifier information of a target device in case of the service information request type, service identifier information of the device in case of the service information response type, identifier information of a target service in case of the peer search request type, or service identifier information of the device in case of the peer search response type.

The discovery signal may further include a service information version field in case of the device advertisement type or the service information request type. The service information version field may have a value that is changed due to variation of a service provided by the device or change of a user of the device.

The discovery signal may further include a request range field in case of the service information request type. The request range field may indicate whether whole service information or a part of service information is requested.

The discovery signal may further include a sequence number for identifying a plurality of services and an end indication for indicating an end of the service information in case of the service advertisement type or the service information response type.

The discovery signal may further include a group indication field in case of the service advertisement type or the service information response type. The group indication field may indicate whether service information for a group communication is provided.

According to further aspect of the present invention, a discovery apparatus is provided in a D2D direct communication. The discovery apparatus includes a processor and a transceiver. The processor selects a discovery resource unit from among discovery resource units which are not being used after listening during one or more discovery resource periods, generates a first discovery signal of a broadcasting manner at a first discovery resource period, and generates a second discovery signal of a query-based manner at a second discovery resource period. The transceiver transmits the first discovery signal through the selected discovery resource unit in the broadcasting manner at the first discovery resource period, and transmits the second discovery signal through the selected discovery resource unit in the query-based manner at the second discovery resource period.

DETAILED DESCRIPTION OF THE EMBODIMENTS

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 1:
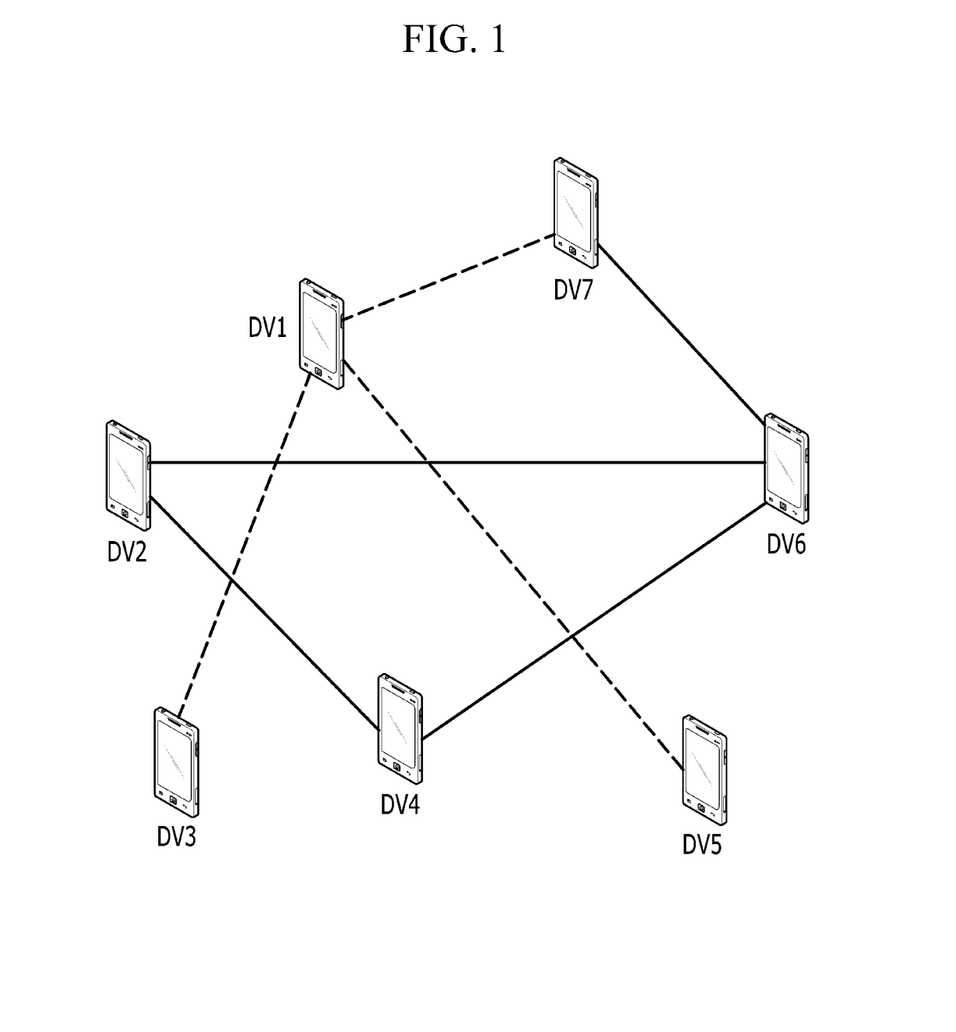
FIG. 1 shows a D2D direct communication system according to an embodiment of the present invention.

FIG. 1 shows a D2D direct communication system according to an embodiment of the present invention.

Referring to FIG. 1, a plurality of devices DV1, DV2, DV3, DV4, DV5, DV6, and DV7 join in a D2D direct communication. A one-to-one communication (DV1 to DV7, DV3 to DV5, DV5 to DV7, or DV3 to DV7) may be performed between one device and the other device, or one-to-many communication may be performed between one device DV2 and the other devices DV1, DV4, and DV6.

Figure 2:
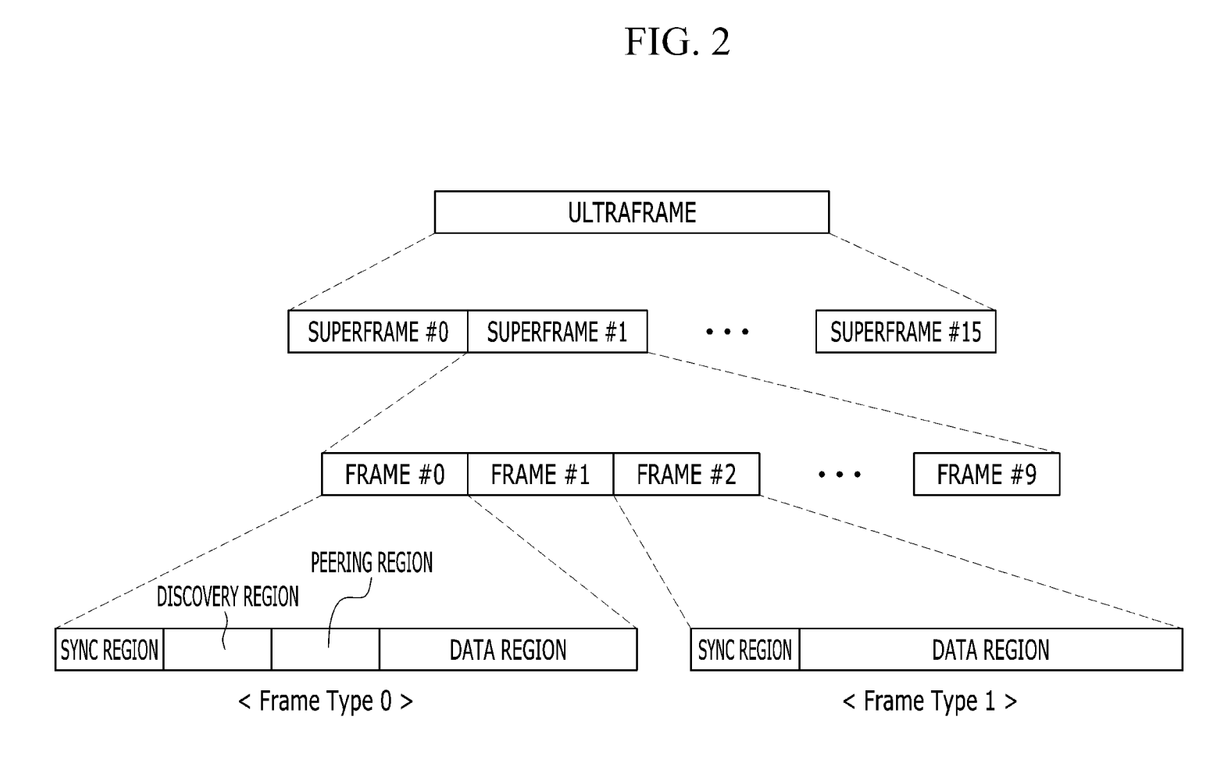
FIG. 2 shows a frame structure in a D2D direct communication according to an embodiment of the present invention.
Figure 3:
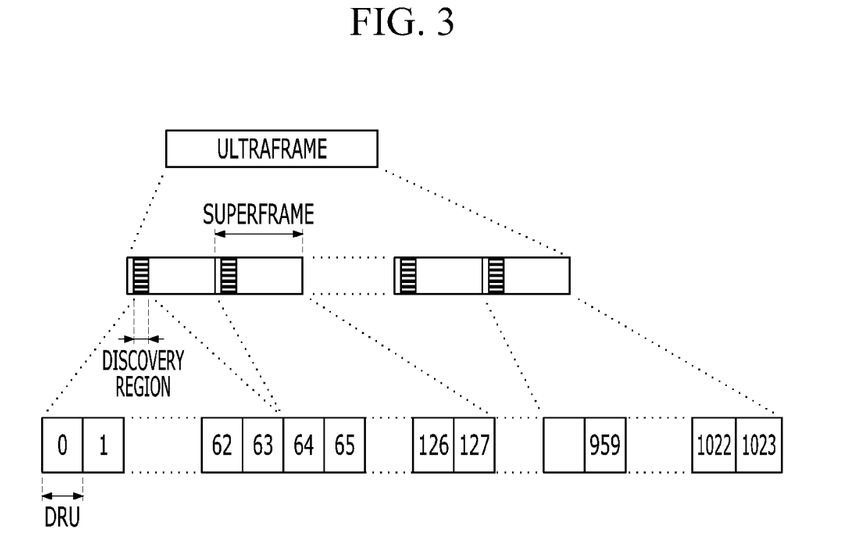
FIG. 3 shows a discovery region in a frame structure of a D2D direct communication according to an embodiment of the present invention.

FIG. 2 shows a frame structure in a D2D direct communication according to an embodiment of the present invention, and FIG. 3 shows a discovery region in a frame structure of a D2D direct communication according to an embodiment of the present invention.

Referring to FIG. 2, a superframe is continuously repeated in a frame structure for the D2D direct communication. A plurality of superframes form an ultraframe, and each superframe includes a plurality of frames. For example, the ultraframe may consist of 16 superframes, and the superframe may consist of 10 frames.

The frame may be classified into two kinds of frame type, i.e., frame type 0 and frame type 1, in accordance with its usage. The frame type 0 includes a synchronization region, a discovery region, a peering region, and a data region, and the frame type 1 includes a synchronization region and a discovery region. In each superframe, the first frame whose frame number is 0 (frame #0) may be the frame type 0, and remaining frames may be the frame type 1. The first frame is a frame that is located at the head of the superframe. A period in which the frame type 0 is repeated is the superframe. The frame has a fixed structure, and is sectionized according to the type. Each of sectionized regions has a fixed length.

In the frame type 0, the discovery region is a region for discovery of other devices for the D2D direct communication, the peering region is a region for connection establishment between the devices, and the data region is a region for scheduling resources in the devices and transmitting data. In the frame type 1, the discovery region and the peering region are substituted into the data region.

Referring to FIG. 3, a discovery region is divided into a plurality of discovery resource units (DRUs). A DRU is a resource which one device uses for transmitting a discovery signal. An ultraframe is a discovery resource period, i.e., a discovery repetition period in which the discovery is repeated. When the discovery region is divided into 64 discovery resource units and the ultraframe consists of 16 superframes, the number of total resources that can be provided during one discovery resource period is 1024. The discovery resource period is related with the number of devices which are maximally supported in the D2D direction communication and can join in the discovery, i.e., a discovery capacity. Each device can select one discovery resource unit, and periodically use the selected discovery resource unit once every discovery resource period. Each device can transmit a signal at the selected discovery resource unit, and receive signals from other devices at remaining discovery resource units.

As such, each device selects a discovery resource unit that is not being used by other devices and periodically uses the selected discovery resource unit, thereby preventing collision that can occur by resource use between neighbor devices.

Figure 4:
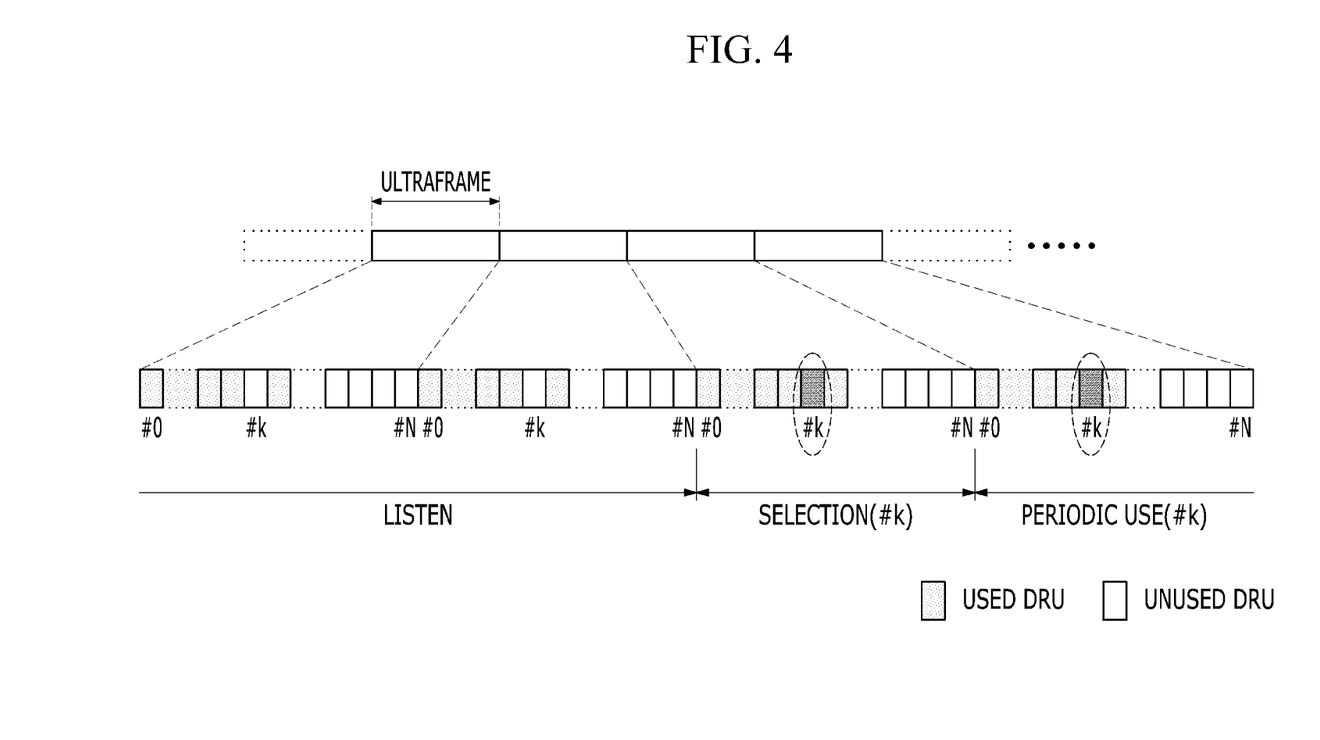
FIG. 4 shows a method for selecting a discovery resource unit in a D2D direct communication according to an embodiment of the present invention.

FIG. 4 shows a method for selecting a discovery resource unit in a D2D direct communication according to an embodiment of the present invention.

Referring to FIG. 4, a device that wants to join in a discovery procedure performs listening during one or more discovery resource periods. That is, the device receives discovery signals during one or more discovery resource periods to check whether the discovery resource units are used or not. Next, the device selects a discovery resource unit (DRU #k) from among discovery resource units that are not being used by other devices, and periodically used the selected discovery resource unit. That is, the device periodically transmits a discovery signal through the selected discovery resource unit.

The discovery signal includes information for allowing the device to perform presence discovery, i.e., device identifier (ID) information. If necessary, the discovery signal may further include service information of the device, request information of information required for discovery of a target device, or response information to the request. According to an embodiment, the discovery signal may be formed as in Table 1.

Table 1 shows one example of a discovery signal according to an embodiment of the present invention.

TABLE 1

| Contents | Bits | Description | Option |
|---|---|---|---|
| Type | 3 | Type of discovery signal<br>0: device advertisement<br>1: service advertisement<br>2: service information request<br>3: service information response<br>4: peer search request<br>5: peer search response | |
| ID | 48 | Identifier of device<br>Type = 0: (own) device ID (e.g. MAC address)<br>Type = 1: (own) (app. Type ID + app. specific ID + app. specific user ID)<br>Type = 2: (target) device ID<br>Type = 3: (own) (app. Type ID + app. specific ID + app. specific user ID)<br>Type = 4: (target) (app. Type ID + app. specific ID + (optional) app. specific user ID)<br>Type = 5: (own) (app. Type ID + app. specific ID + app. specific user ID) | In case of Type = 4, (target) app. specific user ID can be included. |
| Service information version | 5 | Version of service information provided by each device value: 0-31(modulo 32) value can be changed due to addition/deletion of application(s) or change of user | In case or Type = 0 or 2, provided from upper layer based on information of application layer |
| Request range | 1 | Request range of service information<br>1: Delta with (previous) service info. Ver.<br>0: Full with (received) service info. Ver. | In case of Type = 2 |

TABLE 1-continued

| Contents | Bits | Description | Option |
|---|---|---|---|
| SN | 5 | Sequence number | In case of Type = 1 or 3 |
| End indicator | 1 | End indication (0: continue, 1: end) | In case of Type = 1 or 3 |
| GI | 1 | Service information for group communication (0: individual, 1: group) | In case of Type = 1, 3, 4 or 5 |
| Reserved | | Reserved bits | |
| Total | 61 | | |

Referring to Table 1, a discovery signal has 61 bits, and the contents of the discovery signal are determined by the type field.

In the case of type 0 that a device transmits the discovery signal for presence discovery, the discovery signal includes device ID information. The ID field includes an own ID of the device, and a field representing service configuration information is further added to the discovery signal. For example, the service configuration information may be represented as a service information version.

Figure 5:
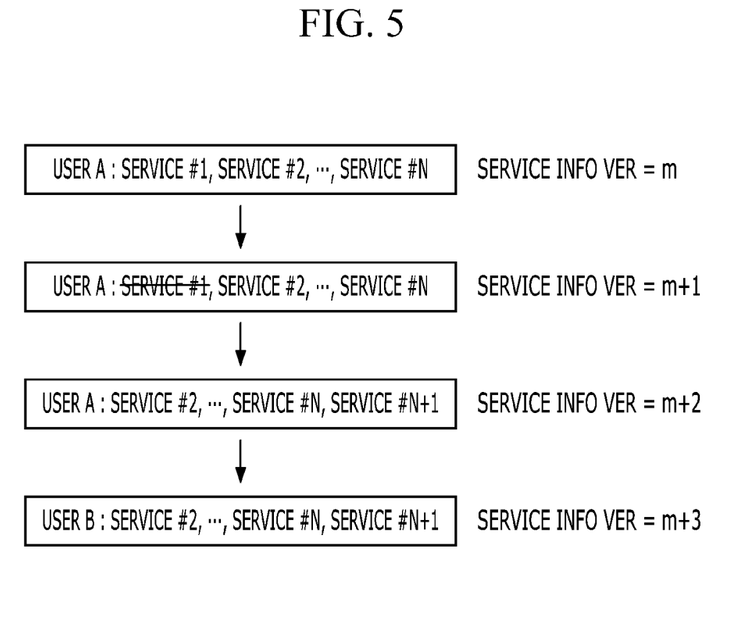
FIG. 5 shows change of a service information version in a D2D direct communication according to an embodiment of the present invention.

A value of the service configuration information is changed due to variation (i.e., addition or deletion) of services provided by the device or change of a user in the device. For example, as shown in FIG. 5, it is assumed that a user of a certain device is user A and the service information version is 'm' when the certain device provides service #1, service #2, . . . , service #N. In this case, if service #1 is deleted in the certain device, the service configuration information is changed (service information version=m+1). Further, if service #N+1 is added in the certain device, the service configuration information is changed (service information version=m+2). Furthermore, if the user of the certain device is changed to user B, the service configuration information is changed (service information version=m+3).

In the case of type 1 that a discovery signal is transmitted to allow neighbor devices to discover a service of a device whose power is turned on or whose service configuration information is changed, the discovery signal includes service information of the device. The ID field includes own service ID information of the device. Further, a sequence number (SN) field and an end indicator field are added to the discovery signal for providing a plurality of service informations. Furthermore, when the service is targeted at a group, a group indication (GI) field is added to indicate that the service ID information represents a group ID. The service ID information consists of a combination of an application type ID (app. type ID), an application specific ID (app. specific ID) and an application specific user ID (app. specific user ID).

In the case of type 2 that a discovery signal is transmitted for requesting service information of a specific device, the discovery signal includes ID information of a target device (i.e., the specific device). The ID field includes a device ID of the target device. Further, a service information version field and a request range field are added to the discovery signal for indicate a range of requested service information.

When the device requests whole information related to a service of the target device, the service information version field in the discovery signal with type 2 transmitted by the device indicates the service information version included in the discovery signal with type 0 that is transmitted by the target device at a transmission time of the discovery signal with type 2. In this case, the request range field in the discovery signal with type 2 may be set to a value of '0' requesting whole information (i.e., full information). When the device requests a part of information related to the service of the target device, the service information version field in the discovery signal with type 2 indicates a version being different from the service information version included in the discovery signal with type 0 that is transmitted by the target device. In this case, the request range field in the discovery signal with type 2 may be set to a value of '1' requesting the part of information (i.e., delta information).

In the case of type 3 that a device transmits a discovery signal as a response to the service information request, the discovery signal includes a response message to the service information request that has been previously received. The ID field includes own service ID information of the device. Further, a sequence number (SN) field and an end indicator field are added to the discovery signal for providing a plurality of service informations. Furthermore, when the service is targeted at a group, a group indication (GI) field is added to indicate that the service ID information represents a group ID.

In the case of type 4 that a device transmits a discovery signal as a request for searching for a peer, the discovery signal includes information about a service to be searched. The ID field includes service ID information of a target service. If the discovery signal is targeted at any device providing the target service, a specific device ID (i.e., an application specific user ID) of the target service is not included in the service ID information. If the discovery signal is targeted at a specific device providing the target service, the specific device ID is included in the service ID information. For a group service, a GI filed is further added to the discovery signal.

In the case of type 5 that a device transmits a discovery signal as a response to a request message searching for a peer, the discovery signal includes information for responding to the request message. The ID field includes own service ID information of the device. A specific device ID of the target service is further to service ID information. For a group service, a GI filed is further added to the discovery signal.

In Table 1, a discovery signal with type 0 or 1 may be transmitted in a broadcasting manner, and a discovery signal with type 2, 3, 4 or 5 may be transmitted in a request/response manner, i.e., a query-based manner. As described above, according to an embodiment of the present invention, discovery signals can be transmitted in a combination of the broadcasting manner and the query-based manner. Next, a method for transmitting discovery signals is described with reference to FIG. 6 to FIG. 9.

Figure 6:
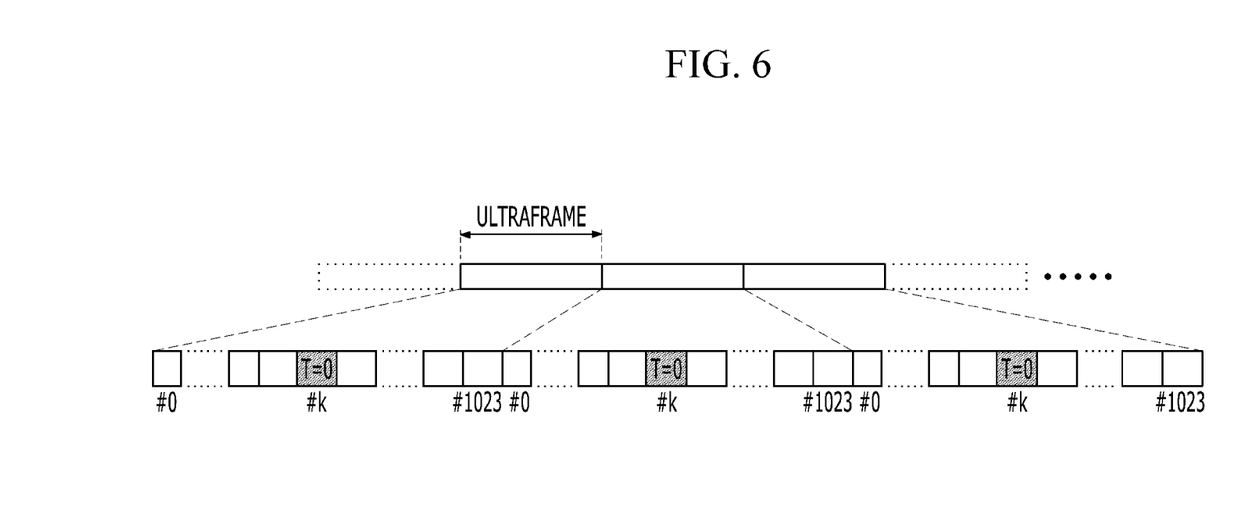
FIG. 6 shows a device advertisement in a discovery method of a D2D direct communication according to an embodiment of the present invention.
Figure 7:
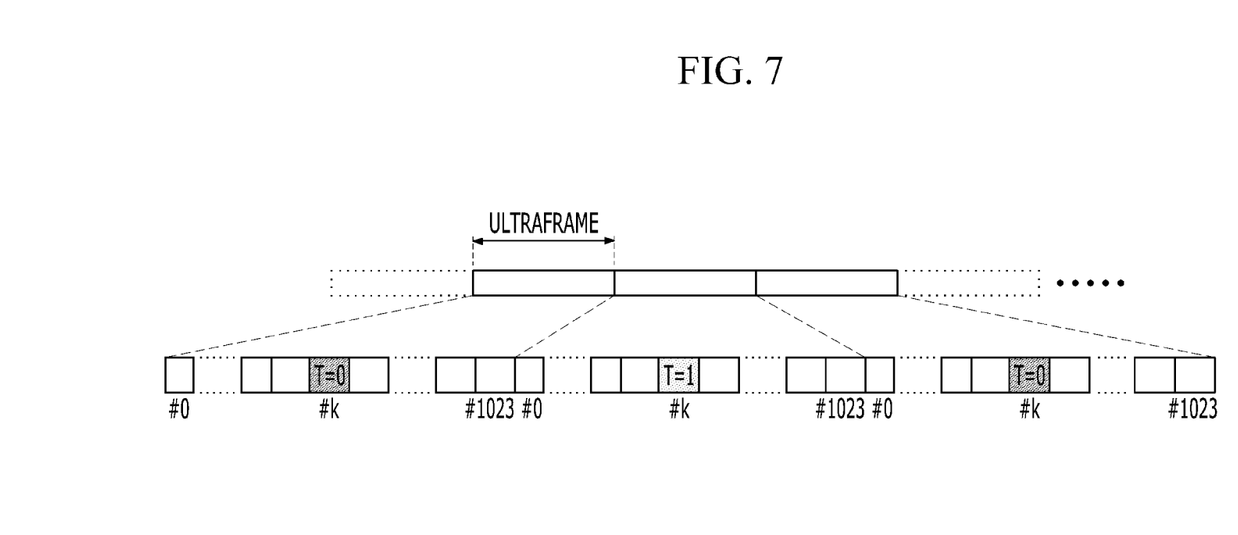
FIG. 7 shows a service advertisement in a discovery method of a D2D direct communication according to an embodiment of the present invention.
Figure 8:
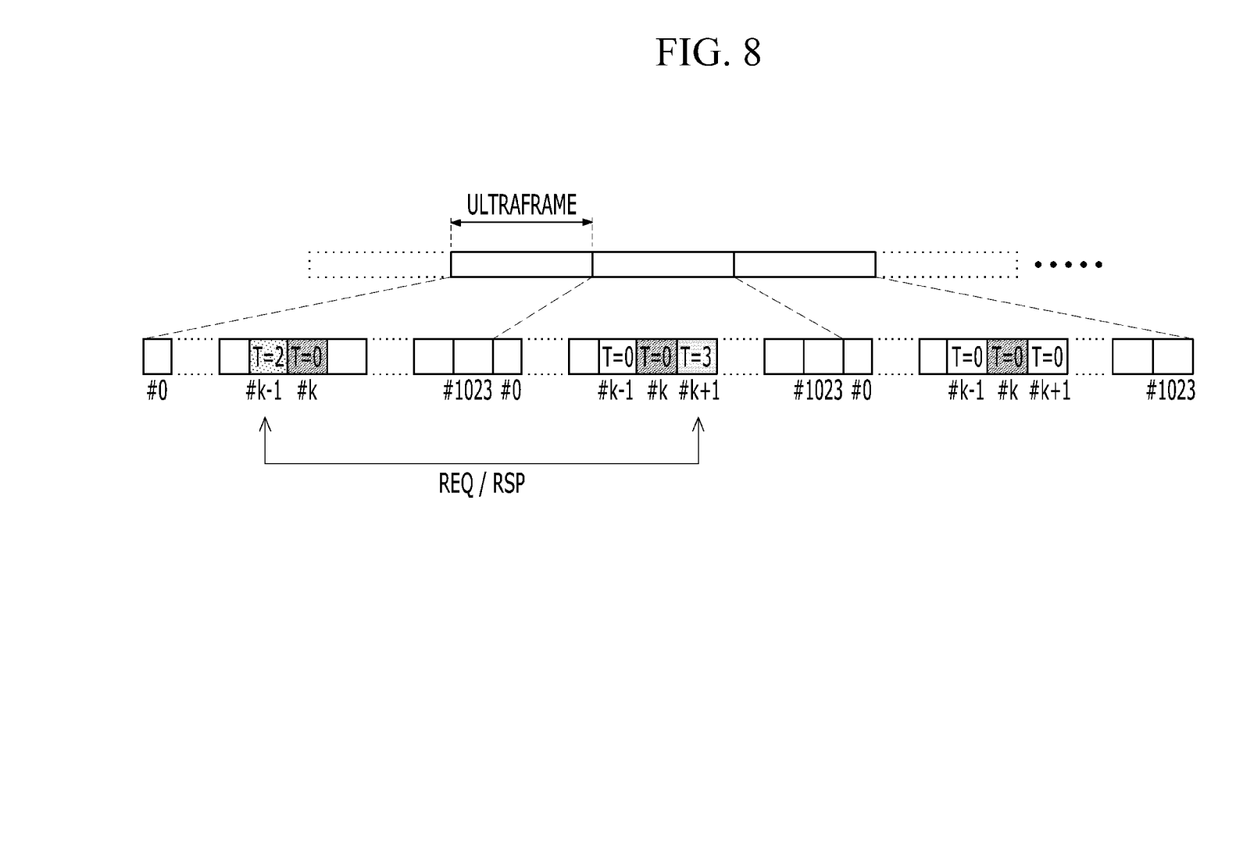
FIG. 8 shows a service information request/response in a discovery method of a D2D direct communication according to an embodiment of the present invention.
Figure 9:
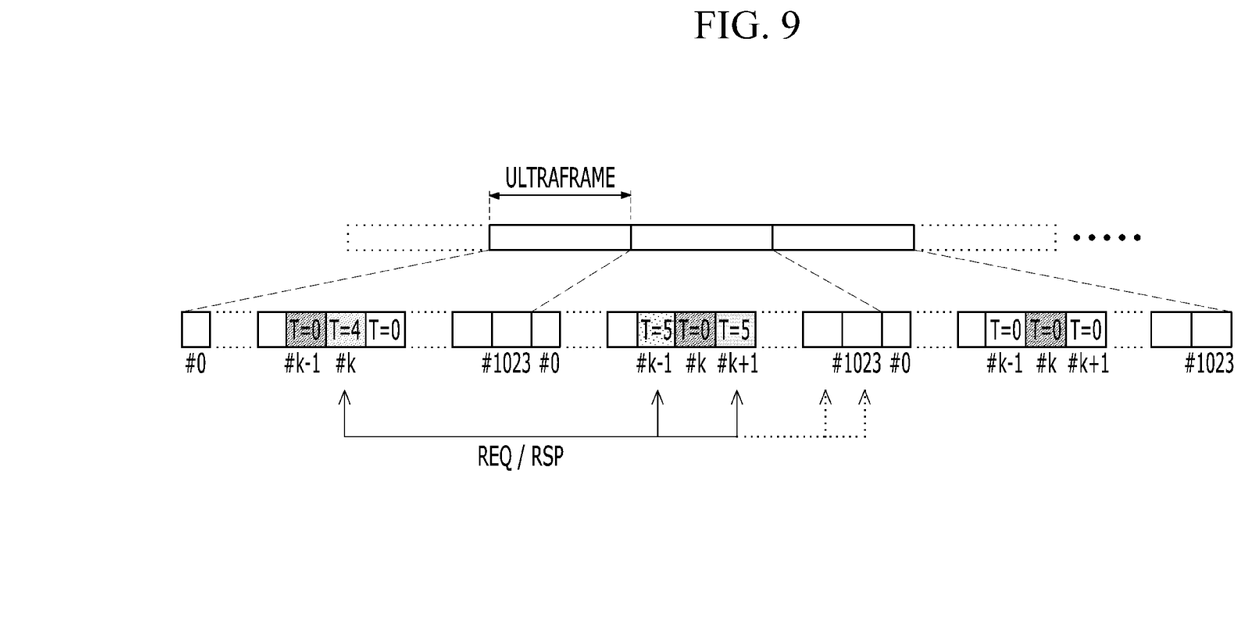
FIG. 9 shows a peer search request/response in a discovery method of a D2D direct communication according to an embodiment of the present invention.

FIG. 6 shows a device advertisement in a discovery method of a D2D direct communication according to an embodiment of the present invention, FIG. 7 shows a service advertisement in a discovery method of a D2D direct communication according to an embodiment of the present invention, FIG. 8 shows a service information request/response in a discovery method of a D2D direct communication according to an embodiment of the present invention, and FIG. 9 shows a peer search request/response in a discovery method of a D2D direct communication according to an embodiment of the present invention.

Referring to FIG. 6, after selecting a discovery resource unit, a device periodically broadcasts device ID information for a device advertisement through the selected discovery resource unit. In this case, the type of the discovery signal is 0 (T=0).

Referring to FIG. 7, the device may non-periodically broadcast service information of the device for a service advertisement through the discovery resource unit that is periodically used. In this case, the type of discovery signal is 1 (T=1).

As shown in FIG. 7, when the device provides one service, the service information, i.e., the discovery signal with type 1 is transmitted at a discovery resource unit of one discovery resource period (i.e., one ultraframe). The discovery signal includes service ID information. When the device provides a plurality of services, information about the plurality of services may be transmitted through a plurality of discovery resource periods. In this case, the discovery signal may include a sequence number (SN) for identifying a service among the plurality of services. Further, when discovery signals including service information provided by the device are continuously transmitted, the discovery signals may include an end indication. Setting the end indication to a predetermined value (e.g., '1') can allow the end indication to indicate a transmission end of service information From a discovery resource period after the end indication is set to '1', the discovery signal with type 0 is transmitted again through the selected discovery resource unit.

Referring to FIG. 8, a device may request service information and receive a response to the request in request/response-based manner.

It is shown in FIG. 8 that a device using discovery resource unit #k−1 request service information of a device using discovery resource unit #k+1. Therefore, a discovery signal with type 2 is transmitted at discovery resource unit #k−1. This discovery signal includes ID information of the device using discovery resource unit #k+1 and service configuration information, i.e., a service information version that is requested. Further, the discovery signal may further include a request range for indicating whether whole service information or a part of service information is requested. After transmitting the discovery signal with type 2, the device broadcasts own ID information again through a discovery signal with type 0 from a next discovery resource period.

If the device transmitting the discovery signal through discovery resource unit #k+1 receives a discovery signal including a service information request from the device using discovery resource unit #k−1, the device transmits a discovery signal with type 3 including a response to the service information request through own discovery resource unit #k+1 at a next discovery resource period. This discovery signal includes own service ID information. When the device provides a plurality of services, the device may the discovery signal with type 3 through a plurality of discovery resource periods. In this case, the discovery signal may further include a sequence number (SN) for identifying a service among the plurality of services and an end indication for indicating a transmission end of service information. After transmitting the discovery signal with type 3, the device broadcasts own ID information again through a discovery signal with type 0 from a next discovery resource period.

Referring to FIG. 9, a device may request a search of a specific service user and receive a response to the request in request/response-based manner.

It is shown in FIG. 9 that a device using discovery resource unit #k transmits a request (i.e., a peer search request) searching for a user using a specific service and a device using discovery resource unit #k+1 transmits a response to the request. Therefore, a discovery signal with type 4 is transmitted at discovery resource unit #k. This discovery signal includes service ID information for requesting responses of neighbor devices. When the device searches for a specific target device, the service ID information includes an ID of the specific device. After transmitting the discovery signal with type 4, the device broadcasts own ID information again through a discovery signal with type 0 from a next discovery resource period.

If the device transmitting the discovery signal through discovery resource unit #k+1 provides the service requested by the discovery signal with type 4, the device transmits a discovery signal with type 5 including a response to the request through own discovery resource unit #k+1 at a next discovery resource period. Other device providing the service requested by the discovery signal with type 4 may also transmit a discovery signal including the response through own discovery resource unit #k−1. This discovery signal includes own service ID information on the requested service.

As described above, according to an embodiment of the present invention, the broadcasting manner can be used together with the query-based manner. Since all information is not needed to be broadcasted by using the query-based manner, the overhead can be decreased and the efficiency of resources can be increased. Further, since each device transmits the device advertisement and the service advertisement in the broadcasting manner, the device can know the status change of neighbor devices without exchanging messages.

Each device may add cyclic redundancy check (CRC) information to a discovery signal and transmit the discovery signal including the CRC information. The device may mask the CRC of the discovery signal with specific key information and add the masked CRC as the CRC information. Then, only a device sharing the specific key information can receive the discovery signal.

Next, a discovery method in a D2D direct communication according to an embodiment of the present invention is described with reference to FIG. 10.

Figure 10:
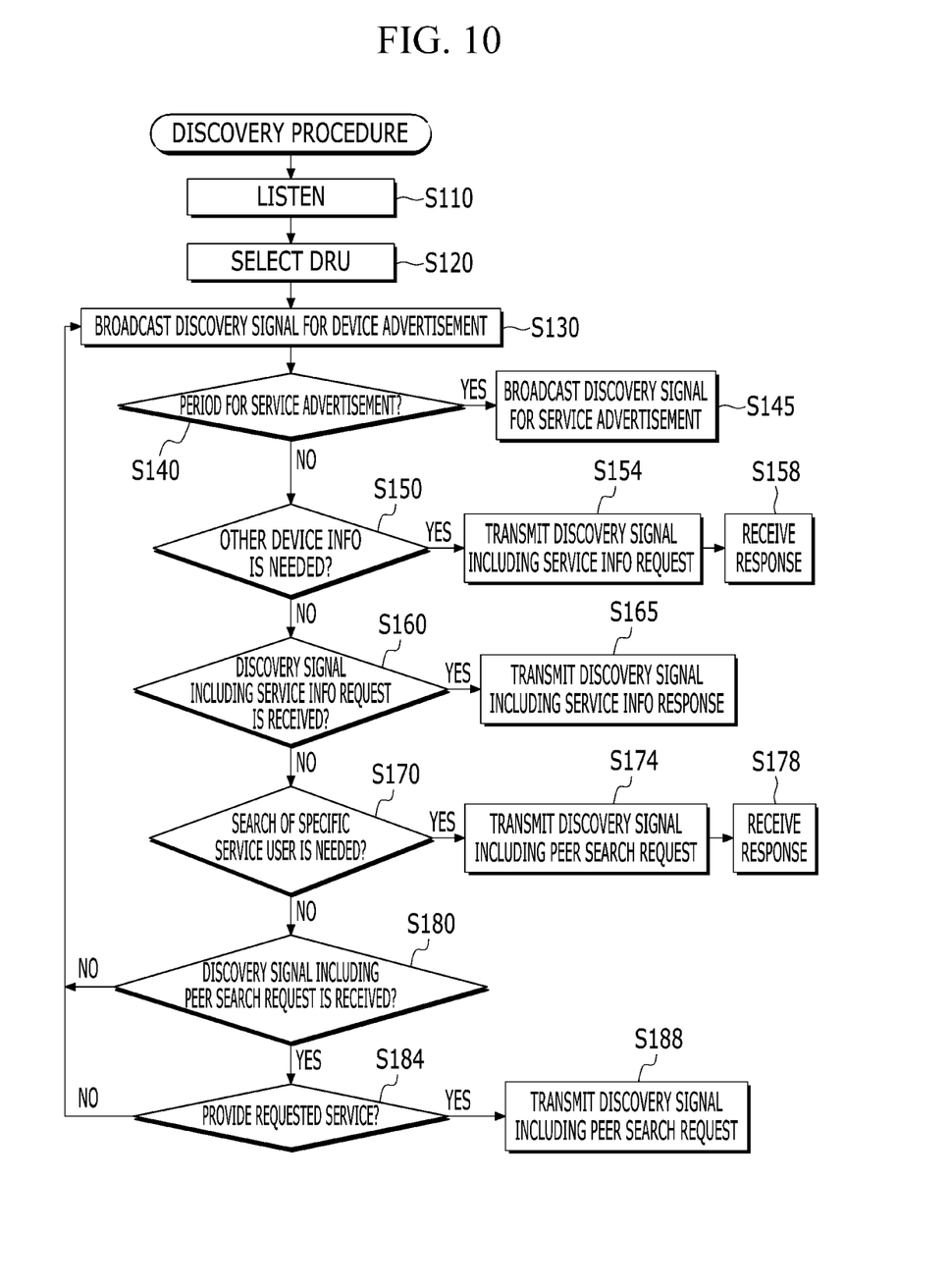
FIG. 10 is a flowchart showing a discovery method in a D2D direct communication according to an embodiment of the present invention.

FIG. 10 is a flowchart showing a discovery method in a D2D direct communication according to an embodiment of the present invention.

Referring to FIG. 10, a device listens during one or more discovery resource periods (S110), and selects a discovery resource unit to be used (S120).

The device periodically broadcasts device ID information at the selected discovery resource unit (S130). If a current discovery resource period is a period for a service advertisement (S140), the device broadcasts a discovery signal for the service advertisement (S145).

If the device needs service information of a specific device (S150), the device transmits a discovery signal including a service information request to the specific device (S154), and receives from the specific device a discovery signal including a response to the service information request at a next discovery resource period (S158). Contrarily, if the device receives a discovery signal including a service information request from other device (S160), the device transmits to the other device a discovery signal including a response to the service information request at a next discovery resource period (S165).

If the device wants to search for a specific service user (S170), the device transmits a discovery signal including a peer search request (S174), and receives from a device of the specific service user a discovery signal including a response to the peer search request at a next discovery resource period (S178). Contrarily, if the device receives a discovery signal including a peer search request from other device (S180), the devices transmits a discovery signal including a response to the peer search request at a next discovery resource period (S188) when the device provides the requested service (S184).

On the other hand, at a discovery resource period in which the device does not transmit the discovery signal including the service advertisement, the service information request or the peer search request, the device may broadcast the discovery signal for the device advertisement (S130).

Next, a discovery apparatus in a D2D direct communication according to an embodiment of the present invention is described with reference to FIG. 11.

Figure 11:
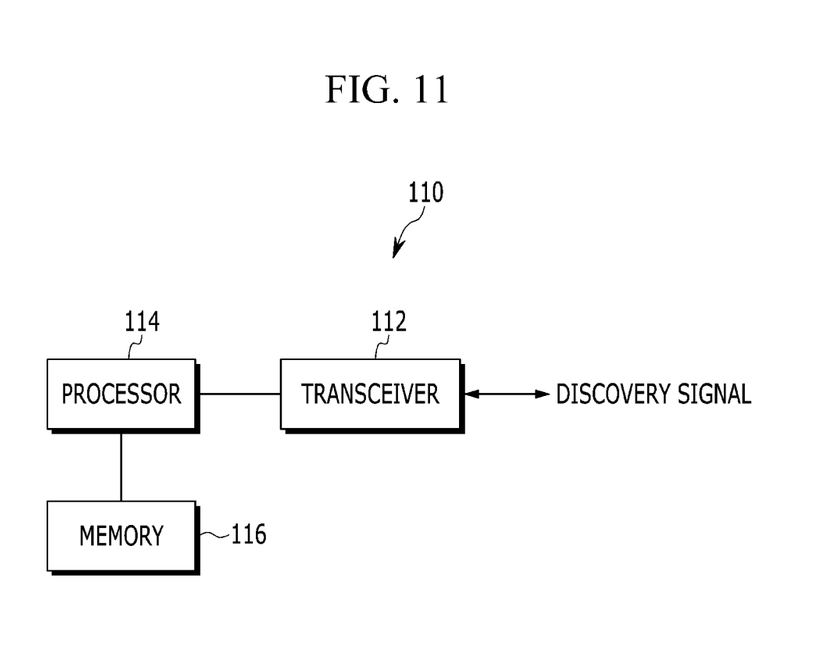
FIG. 11 is a block diagram showing a discovery apparatus in a D2D direct communication according to an embodiment of the present invention.

FIG. 11 is a block diagram showing a discovery apparatus in a D2D direct communication according to an embodiment of the present invention.

Referring to FIG. 11, a discovery apparatus 110 includes a transceiver 112, a processor 114, and a memory 116. The discovery apparatus 110 may be included in a device or may be the device itself.

The transceiver 112 transmits or receives the discovery signal.

The processor 114 selects a discovery resource unit, generates according to an operation of the device at each discovery resource period, and processes the discovery signal from the other device at each discovery resource period. The processor 114 may be implemented by a central processing unit (CPU), other chipset, or a microprocessor.

The memory 116 stores instructions to be executed by the processor 114 or loads the instructions from a storage device (not shown) and temporarily stores them. The processor 114 executes the instructions that are stored or loaded in the memory 116.

The processor 114 and the memory 116 may be connected through a bus (not shown), and an input/output interface (not shown) may be connected to the bus. The input/output interface may be connected with the transceiver 112 and peripheral devices such as an input device, a display device, a speaker, and/or the storage device.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A discovery method by a device in a device-to-device (D2D) direction communication, the method comprising:
   listening during one or more discovery resource periods;
   selecting a discovery resource unit from among discovery resource units which are not being used after listening; and
   transmitting a discovery signal through the selected discovery resource unit in a manner corresponding to one of a plurality of types of the discovery signal,
   wherein discovery signals of a first subset of the plurality of types are transmitted in a broadcasting manner, and discovery signals of a second subset of the plurality of types are transmitted in a query-based manner; and
   the transmitting the discovery signal includes:
      determining whether a type of a first discovery signal to be transmitted for a first discovery resource period belongs to the first subset or the second subset;
      transmitting the first discovery signal in broadcasting manner at the first discovery resource period when the type of the first discovery signal belongs to the first subset;
      determining whether a type of a second discovery signal to be transmitted for a second discovery resource period belongs to the first subset or the second subset; and
      transmitting the second discovery signal in the query-based manner at the second discovery resource period when the type of the second discovery signal belongs to the second subset.

2. The method of claim 1, wherein the first discovery signal is a discovery signal for a device advertisement, and
   the first discovery signal includes identifier information of the device.

3. The method of claim 2, wherein the first discovery signal further includes a service information version, and
   the service information version is changed due to variation of a service provided by the device or change of a user of the device.

4. The method of claim 1, wherein the first discovery signal is a discovery signal for a service advertisement, and
   the first discovery signal includes service identifier information of the device.

5. The method of claim 4, wherein the first discovery signal further includes a sequence number for identifying a plurality of services and an end indication for indicating an end of the service advertisement when the device provides the plurality of services.

6. The method of claim 1, wherein the second discovery signal is a discovery signal for a service information request, and
   the second discovery signal includes identifier information of a target device.

7. The method of claim 6, wherein the second discovery signal further includes a request range for indicating whether whole service information or a part of service information is requested.

8. The method of claim 1, further comprising receiving a third discovery signal for a service information request from other device,
   wherein the second discovery signal is transmitted in response to the third discovery signal and is a discovery signal for a service information response, and
   the second discovery signal includes service identifier information of the device.

9. The method of claim 8, wherein the second discovery signal further includes a sequence number for identifying a plurality of services and an end indication for indicating an end of the service information response when the device provides the plurality of services.

10. The method of claim 1, wherein the second discovery signal is a discovery signal for a peer search request, and
    the second discovery signal includes identifier information of a target service.

11. The method of claim 10, wherein identifier information of a specific device is not included in the identifier information of the target service.

12. The method of claim 1, further comprising receiving a third discovery signal for a peer search request from other device,
 wherein the second discovery signal is transmitted in response to the third discovery signal and is a discovery signal for a service information response when the device provides a service requested by the peer search request, and
 the second discovery signal includes service identifier information of the device.

13. The method of claim 1, further comprising:
 masking a cyclic redundancy check (CRC) of the first discovery signal or second discovery signal with specific key information; and
 adding the masked CRC to the first discovery signal or the second discovery signal.

14. A discovery method by a device in a device-to-device device (D2D) direct communication, the method comprising:
 periodically transmitting a discovery signal through a discovery resource unit in a manner corresponding to one of a plurality of types of the discovery signal; and
 receiving discovery signals from other devices through other discovery resource units,
 wherein discovery signals of a first subset of the plurality of types are transmitted in a broadcasting manner, and discovery signals of a second subset of the plurality of types are transmitted in a query-based manner;
 wherein the transmitting the discovery signal includes
  determining whether a type of a first discovery signal to be transmitted for a first discovery resource period belongs to the first subset or the second subset,
  transmitting the first discovery signal in broadcasting manner at the first discovery resource period when the type of the first discovery signal belongs to the first subset,
  determining whether a type of a second discovery signal to be transmitted for a second discovery resource period belongs to the first subset or the second subset, and
  transmitting the second discovery signal in the query-based manner at the second discovery resource period when the type of the second discovery signal belongs to the second subset; and
 wherein the discovery signal includes
  a type field for indicating any one type of plurality of types having the first subset including a device advertisement type and a service advertisement type, and the second subset including a service information request type, a service information response type, a peer search request type, and peer search response type, and
  an identifier field including identifier information according to the type indicated by the type field.

15. The method of claim 14, wherein the identifier information is
 identifier information of the device in case of the device advertisement type,
 service identifier information of the device in case of the service advertisement type,
 identifier information of a target device in case of the service information request type,
 service identifier information of the device in case of the service information response type,
 identifier information of a target service in case of the peer search request type, or
 service identifier information of the device in case of the peer search response type.

16. The method of claim 14, wherein the discovery signal further includes a service information version field in case of the device advertisement type or the service information request type, and
 the service information version field has a value that is changed due to variation of a service provided by the device or change of a user of the device.

17. The method of claim 14, wherein the discovery signal further includes a request range field in case of the service information request type, and
 the request range field indicates whether whole service information or a part of service information is requested.

18. The method of claim 14, wherein the discovery signal further includes a sequence number for identifying a plurality of services and an end indication for indicating an end of the service information in case of the service advertisement type or the service information response type.

19. The method of claim 14, wherein the discovery signal further includes a group indication field in case of the service advertisement type or the service information response type, and
 the group indication field indicates whether service information for a group communication is provided.

20. A discovery apparatus in a device-to-device direction communication, the apparatus comprising:
 a processor configured to select a discovery resource unit from among discovery resource units which are not being used after listening during one or more discovery resource periods; and
 a transceiver configured to transmit a discovery signal through the selected discovery resource unit in a manner corresponding to one of a plurality of types of the discovery signal,
 wherein discovery signals of a first subset of the plurality of types are transmitted in a broadcasting manner, and discovery signals of a second subset of the plurality of types are transmitted in a query-based manner; and
 the transmitting the discovery signal includes:
  determining whether a type of a first discovery signal to be transmitted for a first discovery resource period belongs to the first subset or the second subset,
  transmitting the first discovery signal in the broadcasting manner at the first discovery resource period when the type of the first discovery signal belongs to the first subset,
  determining whether a type of a second discovery signal to be transmitted for a second discovery resource period belongs to the first subset or the second subset, and
  transmitting the second discovery signal in the query-based manner at the second discovery resource period when the type of the second discovery signal belongs to the second subset.

* * * * *